United States Patent
Fioravanti

(10) Patent No.: US 7,374,250 B2
(45) Date of Patent: May 20, 2008

(54) RIM FOR MOUNTING TUBELESS TIRES, PARTICULARLY FOR BICYCLES, MOTORCYCLES AND MOPEDS

(75) Inventor: Moreno Fioravanti, Ozzano Dell 'Emilia (IT)

(73) Assignee: Alpina Raggi S.p.A., Lomagna (IT)

( * ) Notice: Subject to any disclaimer, the term of this patent is extended or adjusted under 35 U.S.C. 154(b) by 0 days.

(21) Appl. No.: 10/398,822

(22) PCT Filed: Oct. 1, 2001

(86) PCT No.: PCT/EP01/11339

§ 371 (c)(1),
(2), (4) Date: Apr. 9, 2003

(87) PCT Pub. No.: WO02/32695

PCT Pub. Date: Apr. 25, 2002

(65) Prior Publication Data

US 2004/0004391 A1 Jan. 8, 2004

(30) Foreign Application Priority Data

Oct. 17, 2000 (IT) .................. B02000U0139 U
Feb. 23, 2001 (IT) .................. B02001U0017 U

(51) Int. Cl.
*B60B 21/12* (2006.01)
(52) U.S. Cl. .................... 301/58; 301/95.104
(58) Field of Classification Search .............. 301/55, 301/58, 95.101, 95.104, 95.106; 220/233, 220/234, 235, 237, 327
See application file for complete search history.

(56) References Cited

U.S. PATENT DOCUMENTS

| | | | | |
|---|---|---|---|---|
| RE1,576 E | * | 11/1863 | Shaw ..................... 215/361 |
| 343,647 A | * | 6/1886 | Morehouse ............... 215/361 |
| 633,537 A | * | 9/1899 | Stewart ................... 220/235 |
| 2,937,905 A | * | 5/1960 | Altenburger ............. 301/58 |
| 2,978,138 A | * | 4/1961 | Moeller ................... 220/235 |
| 3,451,583 A | * | 6/1969 | Leighton ................. 220/233 |

(Continued)

FOREIGN PATENT DOCUMENTS

EP   A-0 615 865   9/1994

(Continued)

OTHER PUBLICATIONS

Patent Abstracts of Japan vol. 2000, No. 06, Sep. 22, 2000 & JP 2000 071701 A (INOAC Corp; Araya Kogyo KK; INOAC Elastomer KK), Mar. 7, 2000 abstract.

*Primary Examiner*—Russell D. Stormer
(74) *Attorney, Agent, or Firm*—Stradley Ronon Stevens & Young, LLP

(57) ABSTRACT

A rim for mounting tubeless tires, particularly for bicycles, motorcycles and mopeds, constituted by a profiled element which is curved in a circular fashion and is symmetrical with respect to a centerline plane (P), said profiled element forming an outer annular seat (2) and an inner annular seat which are divided by an annular partition provided with slots arranged opposite the nipples (6) associated with the spokes of said rim, a tire of the tubeless type being associated with said outer annular seat so as to form a pressure chamber. The rim comprises closure elements that engage said slots in order to hermetically separate said outer annular seat from said inner annular seat.

11 Claims, 7 Drawing Sheets

U.S. PATENT DOCUMENTS

| | | | | |
|---|---|---|---|---|
| 3,622,034 A | * | 11/1971 | Lutzker et al. | 220/787 |
| 3,698,593 A | * | 10/1972 | Cvacho et al. | 220/203.29 |
| 3,828,968 A | * | 8/1974 | Kask | 220/234 |
| 3,837,522 A | * | 9/1974 | Lesnansky, Jr. | 220/235 |
| 3,923,192 A | * | 12/1975 | Walters | 220/235 |
| 4,448,456 A | * | 5/1984 | Pfundstein | 301/58 |
| 4,573,605 A | * | 3/1986 | Udell | 220/304 |
| 5,779,085 A | * | 7/1998 | Havlinek et al. | 220/234 |
| 5,886,297 A | * | 3/1999 | Vogt | 174/50.5 |
| 6,145,937 A | * | 11/2000 | Chen | 301/58 |
| 6,250,337 B1 | * | 6/2001 | Bevacco | 138/89 |

FOREIGN PATENT DOCUMENTS

| | | | |
|---|---|---|---|
| EP | A-0 790 141 | | 8/1997 |
| FR | 2622871 | * | 5/1989 |
| GB | 2096109 | * | 10/1982 |

* cited by examiner

RIM FOR MOUNTING TUBELESS TIRES, PARTICULARLY FOR BICYCLES, MOTORCYCLES AND MOPEDS

BACKGROUND OF THE INVENTION

The present invention relates to a rim for mounting tubeless tires, particularly for bicycles, motorcycles and mopeds.

Rims for accommodating tires of the conventional type are already known and are constituted by a profiled element which is curved in a circular fashion, is symmetrical with respect to a centerline plane, and forms an outer annular seat and an inner annular seat; the outer and inner annular seats are divided by an annular partition provided with slots. The outer annular seat is provided, on the side directed toward the center of the rim, with coupling holes through which slots guide nipples for connecting the spokes to the rim. The inner annular seat defines lateral shoulders, which form a receptacle for retaining the beads of the tire.

These rims have a severe drawback, which is due to the fact that they only allow mounting of conventional tires and therefore necessarily entail interposing an inner tube between the receptacle and the tire; accordingly, such rims cannot be used as means for supporting tubeless-type tires.

Rims adapted for mounting tubeless tires are known from the documents EP-A-0 709 141, Patent Abstracts of Japan vol. 2000, no. 06, 22 Sept. 2000, and EP-A-0 615 865.

SUMMARY OF THE INVENTION

The aim of the present invention is to obviate the cited drawbacks by providing a rim that does not suffer the above noted drawbacks.

Within this aim, an object of the present invention is to provide a rim that can have usefulness and economical industrial application.

Still another object of the present invention is to provide a structure that is simple, relatively easy to provide in practice, safe in use and effective in operation.

This aim and these and other objects which will become better apparent hereinafter are achieved by a rim, according to the invention, which has the features set forth in the Claims.

Advantageous constructional features are set forth in the dependent claims.

BRIEF DESCRIPTION OF THE DRAWINGS

Further characteristics and advantages will become better apparent from the detailed description of a preferred non-exclusive embodiment of a rim for mounting tubeless tires, particularly for bicycles, motorcycles and mopeds, according to the invention, illustrated only by way of non-limitative example in the accompanying drawings, wherein.

Similar or corresponding constructional features of the various embodiments represented in the Figures are indicated therein by the same reference numerals.

DESCRIPTION OF THE PREFERRED EMBODIMENTS

Figure 1:
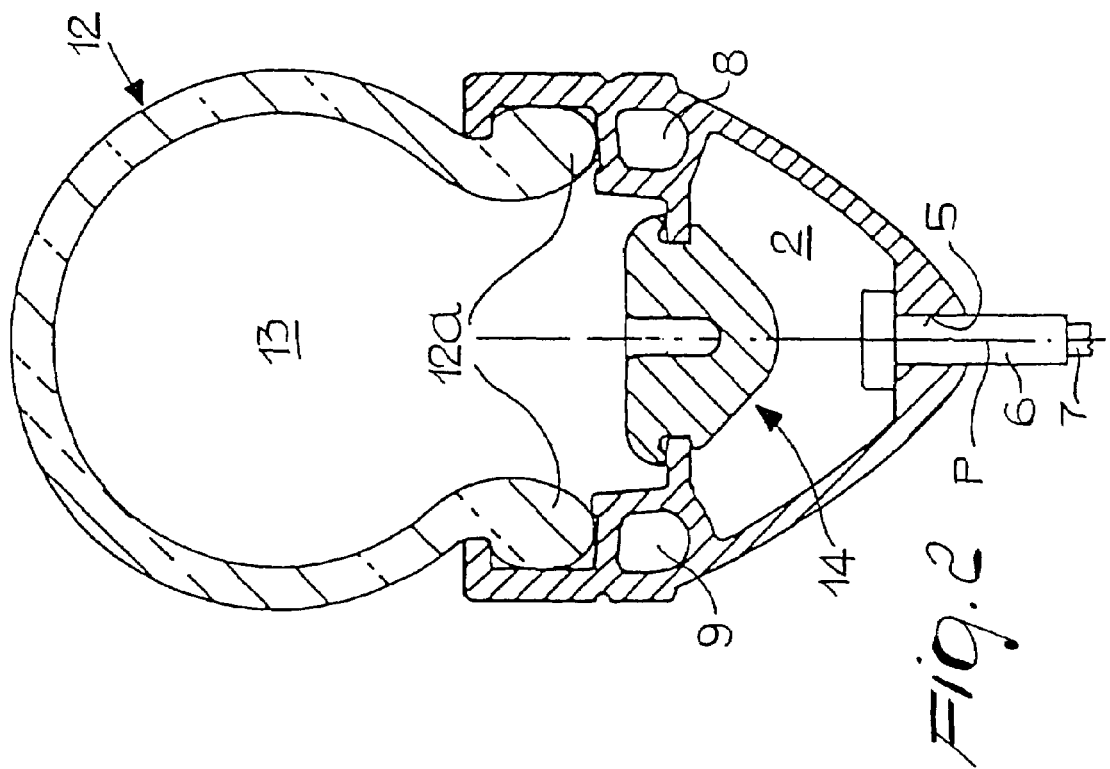
FIG. 1 is a cross-sectional view of the rim according to the invention.
Figure 2:
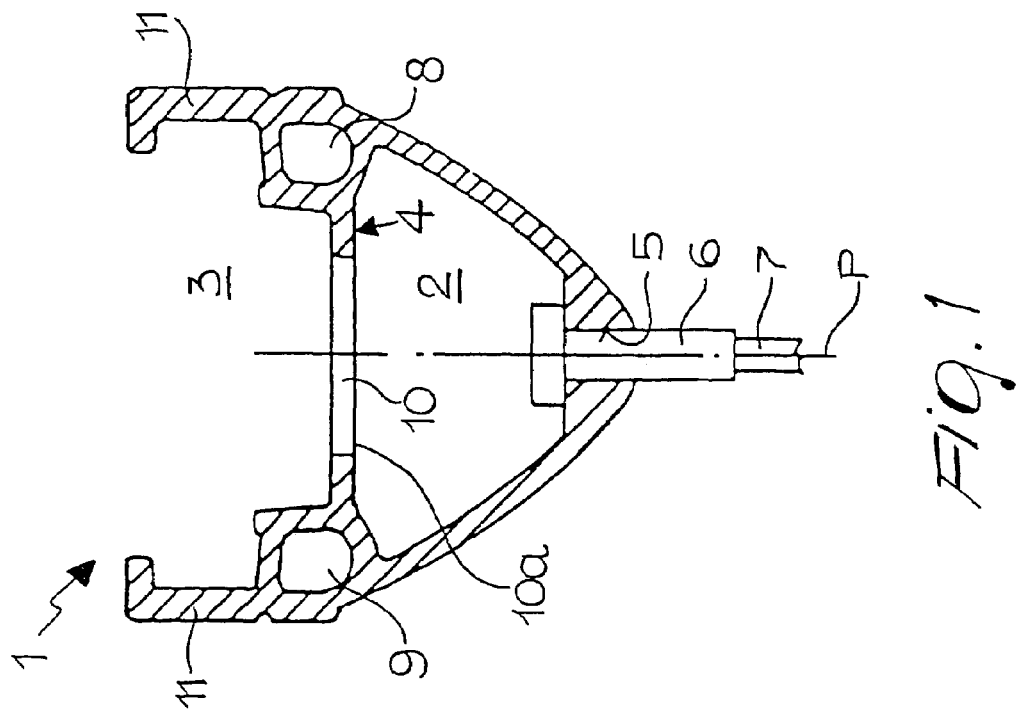
FIG. 2 is a cross-sectional view of said rim, on which a tire of the tubeless type is fitted hermetically.
Figure 3:
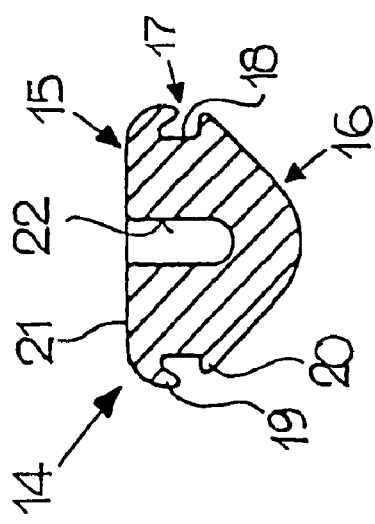
FIGS. 3 and 4 are, respectively, an axial sectional view and a top view of a sealing plug.
Figure 4:
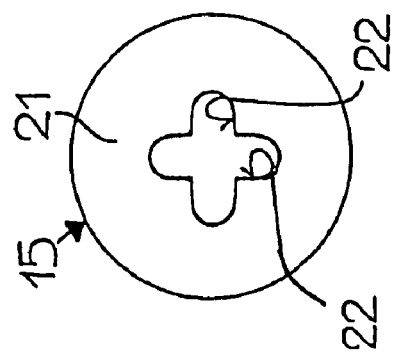
Figure 5:
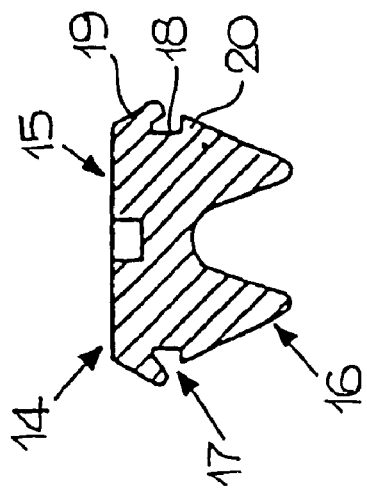
FIGS. 5 and 6 are views of a second embodiment of the plug of FIGS. 3 and 4.
Figure 6:
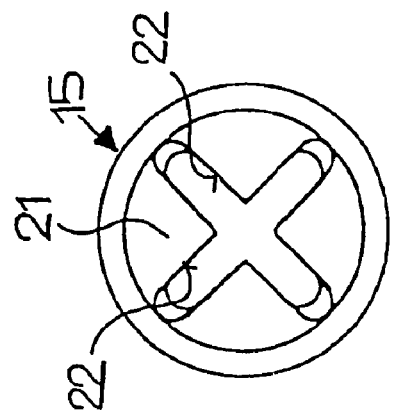
Figure 7:
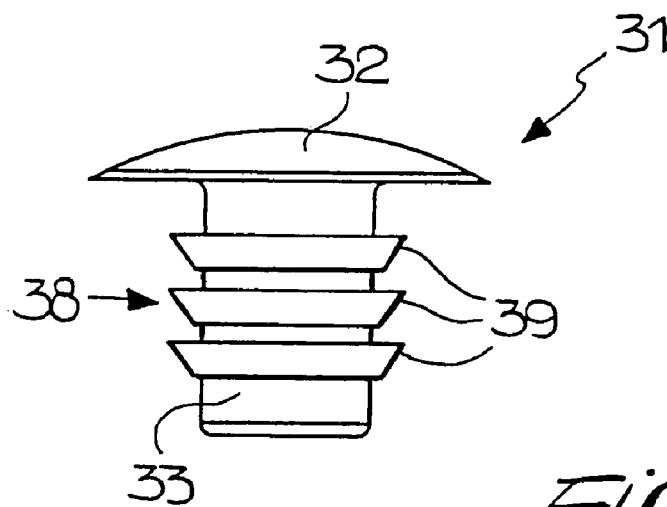
FIGS. 7 and 8 are respectively a side view and a sectional view of a third embodiment of the sealing plugs.
Figure 8:
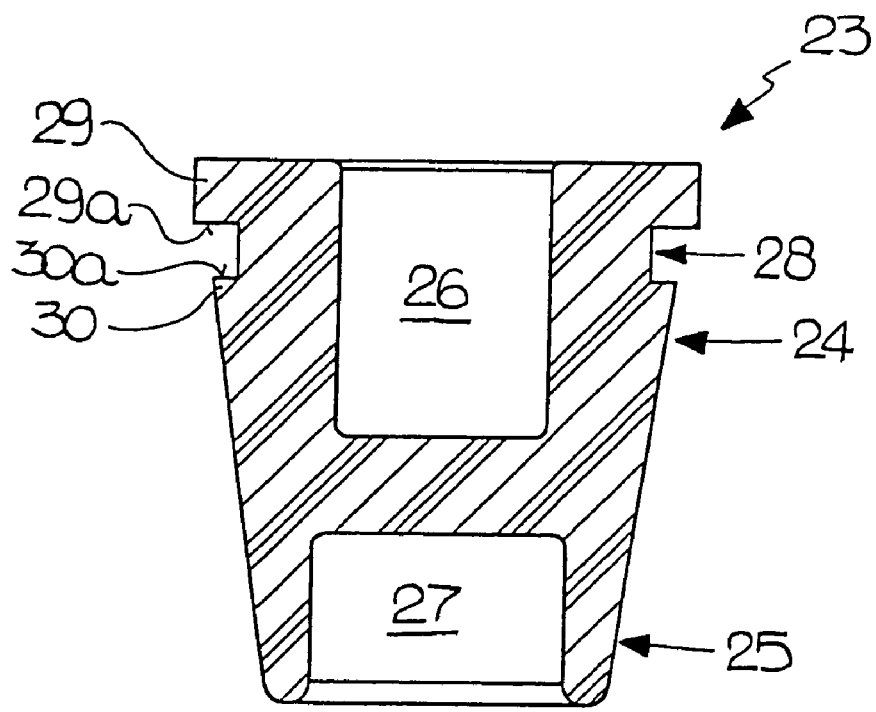
Figure 9:
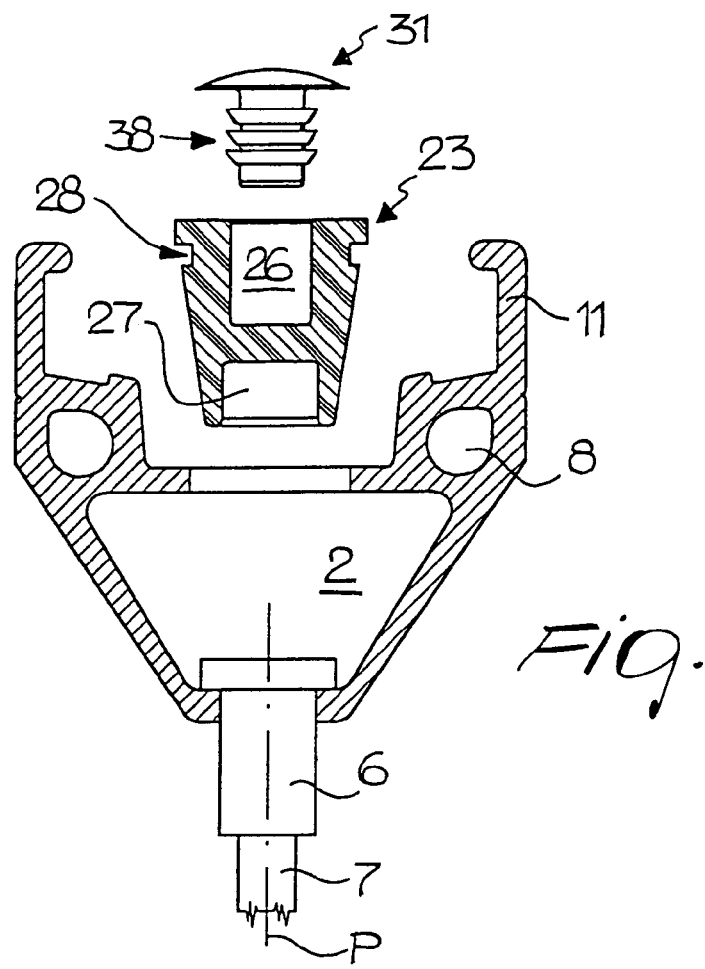
FIGS. 9 and 10 are sectional views of the sealing plugs of FIGS. 7 and 8 respectively in a mounting position and in a mounted position.
Figure 10:
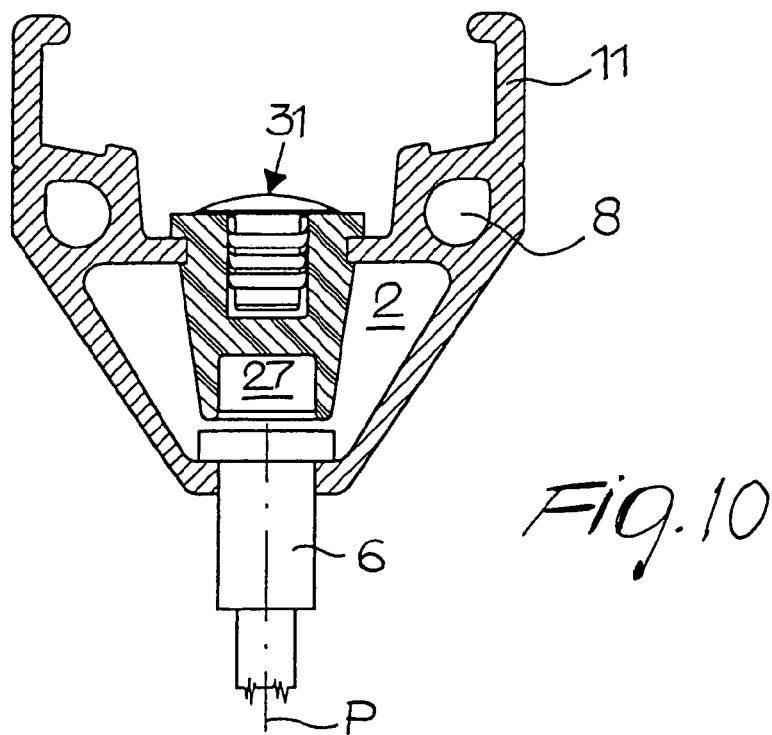

With reference to the figures, the reference numeral 1 generally designates a bicycle wheel rim constituted by a profiled element, which is curved in a circular fashion and is symmetrical with respect to a centerline plane P. The rim 1 has an outer annular seat 2 and an inner annular seat 3, which are separated by a partition 4. The outer annular seat 2 is provided with a plurality of receptacles 5, in which the nipples 6 connected to the ends 7 of a respective plurality of spokes are inserted. Two ridges 8 and 9 for stiffening the rim 1 are provided on the opposite side with respect to the plurality of receptacles 5, in order to provide resistance to the mechanical stresses affecting the rim 1. The partition 4 is interposed rigidly in a bridge-like fashion between the two ridges 8 and 9 and further stiffens the rim 1. Slots 10 are provided in the partition 4, in opposition to each receptacle 5, in order to allow access to the annular seat 2 and therefore allow the nipples 6 to be fixed in a fully automatic manner.

The inner annular seat 3 defines lateral flanges 11 suitable to retain the beads 12a of the tire 12, so that the association of said tire 12 with the inner annular seat 3 forms a pressure chamber 13.

The slots 10 can be engaged removably and hermetically by closure elements constituted by sealing plugs 14, shown in FIGS. 3-6. Each one of the sealing plugs 14 comprises a head 15 and a shank 16, between which sealing means 17 are formed in an annular fashion and engage hermetically the edge 10a of the slot 10. The sealing means 17 is constituted by an annular groove 18, which is delimited, in an upward region, by an expandable lip 19 associated with the head 15 and by an annular tooth 20 associated with the shank 16. The head 15 has, on its upper face 21, mutually perpendicular recesses 22 shaped so as to allow the compression of the head 15 toward the center, thus allowing easy insertion/extraction of the sealing plug 15 in and from the corresponding slots 10 and thus allowing separation hermetically, once the mounting of the tire 12 has been completed, of the pressure chamber 13 from the outer annular seat 2.

In practical operation, the nipples 6 are guided through the slots 10 and are fixed in the corresponding receptacles 5. After fixing the nipples and connecting the spokes to the rim by means of the nipples 6, the slots 10 are closed hermetically by means of the sealing plugs 14. This allows separation hermetically of the outer annular seat 2 from the pressure chamber 13 when the tubeless tire 12 is applied to the inner annular seat 3.

It has thus been found that the invention achieves the proposed aim and objects.

In particular, the fact is stressed that a tubeless-type tire can be mounted on the above described rim.

Furthermore, it is very easy to assemble the spoke set, since the nipples and the corresponding spokes can be guided very easily through the plurality of receptacles.

The invention thus conceived is susceptible of numerous modifications and variations, all of which are within the scope of the inventive concept.

A third embodiment is shown in the accompanying drawings 7 to 10.

In this third embodiment, the closure elements consist of sealing plugs 23 having a frustum-like shape that forms a head 24 and a shank 25 which can expand and are provided with respective coaxially opposite cylindrical cavities 26 and 27. The head 24 comprises an annular groove 28, which is delimited in an upward region by an expandable lip 29 and in a downward region by a tooth 30. The expandable lip 29 and the tooth 30 form opposite abutments 29a, 30a which, by acting against the outer and inner edges of the slot 10, prevent the axial extraction of the sealing plug 23.

Complementary sealing plugs 31 are detachably associated with the sealing plug 23 and have a head 32 and a shank 33 on which expansion elements 38, constituted by frustum-shaped annular protrusions 39, are provided. The complementary sealing plug 31 is inserted with its shank 33 in the cylindrical cavity 26, which by way of the transverse pressure of the expansion elements 38 on the walls of said cavity 26 causes the expansion of the head 24 and therefore a tighter seal of the sealing plug 23 on the slot 10.

Figure 11:
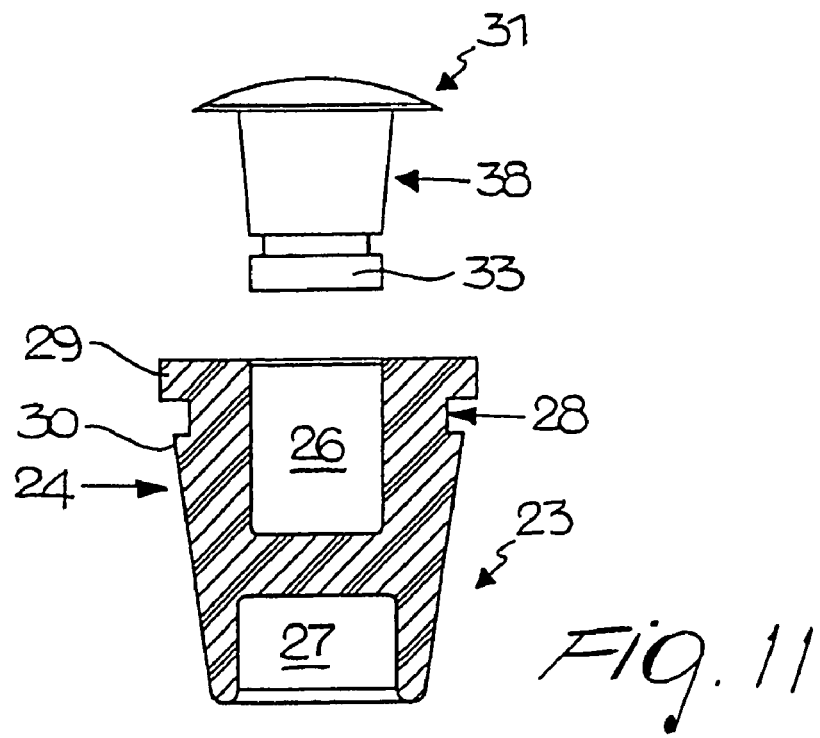
FIGS. 11 and 12 are views of a fourth embodiment of the sealing plugs.

Advantageously, as shown in FIG. 11, there are expansion elements 38 formed by the frustum-shaped profile of the shank 33. In this case also, the result of the insertion of the complementary plug 31 in the sealing plug 23, by means of the frustum-shaped profile, is of the same type described above.

Figure 12:
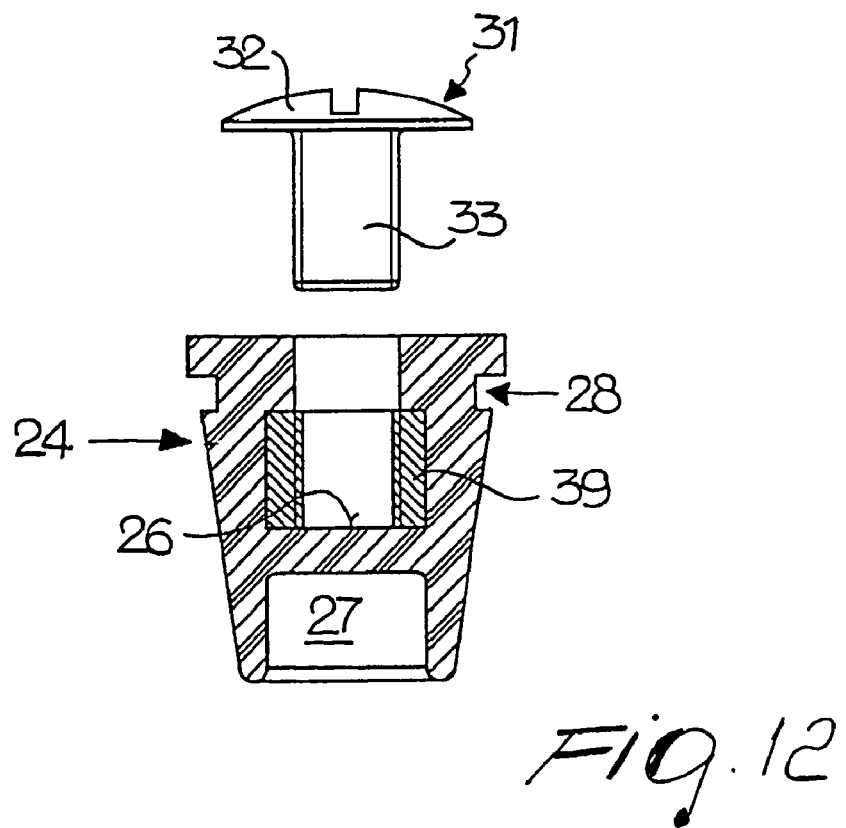
Figure 13:
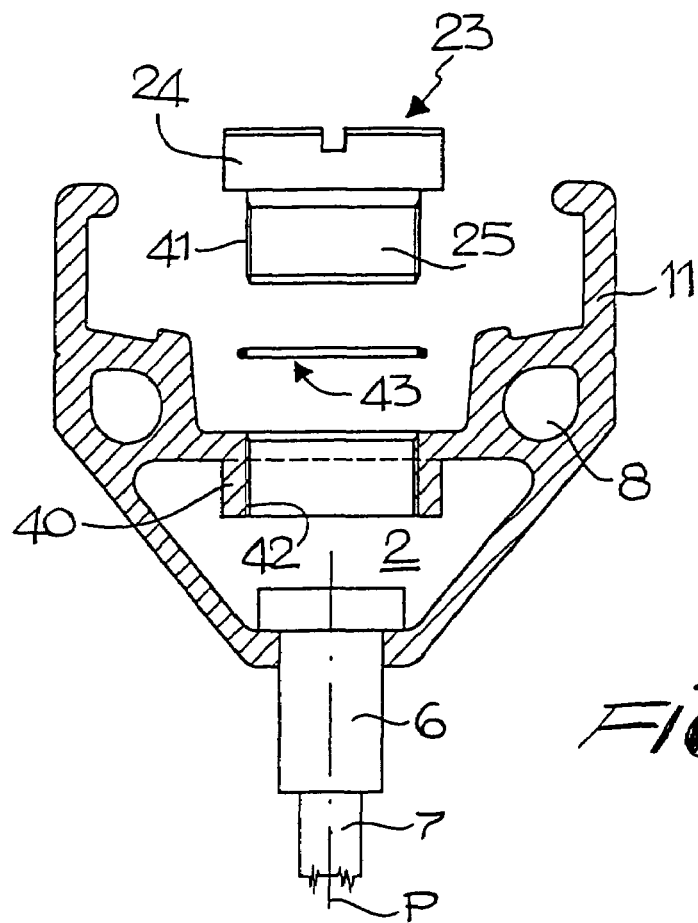
FIGS. 13 and 14 are views of a fifth embodiment of the sealing plugs.
Figure 14:
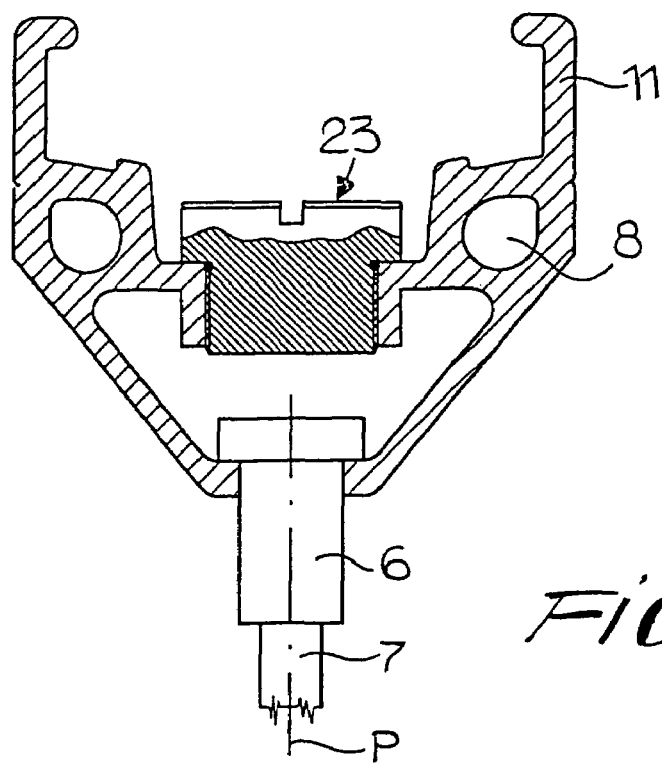
Figure 15:
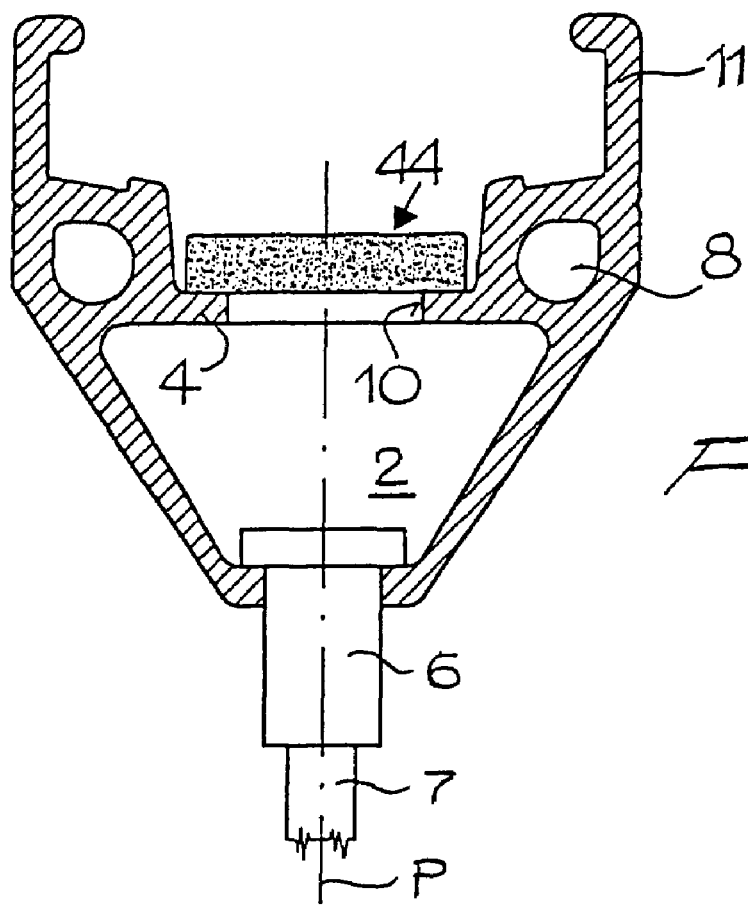
FIGS. 15 and 16 are views of a sixth embodiment of the sealing plugs.
Figure 16:
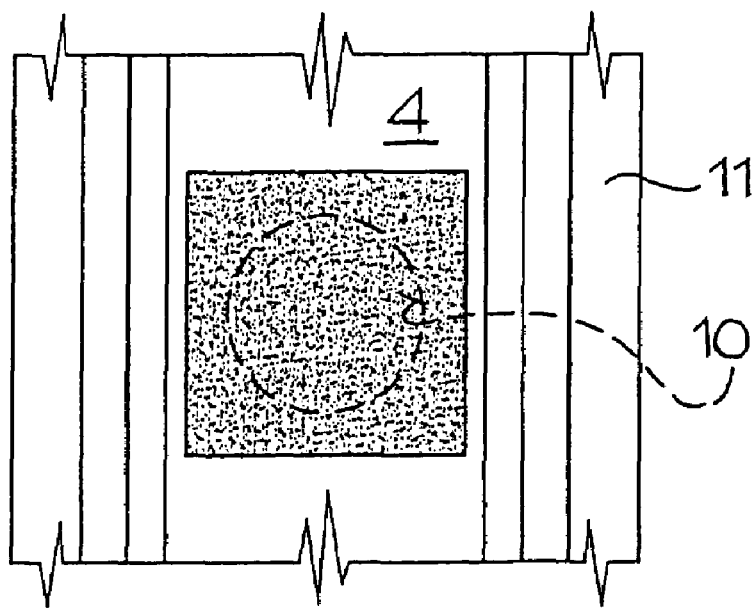

In a fourth embodiment, FIGS. 11 and 12, the expansion elements 38 are constituted by a threaded expandable insert 39, which is accommodated substantially at the bottom of the cavity 26. In this case, the complementary plug 31 is screwed into the insert 39 through the cavity 26, and said insert 39, by expanding against the walls of said cavity 26, causes the head 24 to expand.

Conveniently, a fifth embodiment of the sealing plug 23 is provided which has a head 24 and a shank 25 having a cylindrical shape. The sealing plug 23 is designed to removably enter the slot 10, which protrudes into the outer annular seat 2 by means of an undercut 40. The insertion and sealing of the sealing plug in the slot 10 are achieved by way of sealing means, which in this case consist of corresponding helical threads 41, 42 provided respectively on the facing surfaces of the shank 25 and of the undercut 40. Furthermore, in order to increase the seal and improve the hermetic separation between the outer annular seat 2 and the inner one 3, a ring 43 is interposed between the head and the passage hole.

In a sixth embodiment, the closure elements consist of adhesive bands 44, which are applied so as to provide a hermetic closure at the slots 10. The adhesive bands 44 can be distributed with a constant spacing at each slot 10 or continuously along the annular partition 4.

It has thus been shown that the invention achieves the proposed aim and objects.

All the details may further be replaced with other technically equivalent ones.

In practice, the materials used, as well as the shapes and the dimensions, may be any according to requirements without thereby abandoning the scope of the protection of the appended claims.

The Italian Utility Model Applications No. BO2000U000139 and BO2001U000017 are the documents from which this application claims priority.

What is claimed is:

1. A rim for mounting tubeless tires for bicycles, motorcycles and mopeds, constituted by a profiled element which is curved in a circular fashion and is symmetrical with respect to a centerline plane, comprising:

an inner annular seat adapted to receive and retain a tubeless type tire so as to form a pressure chamber;

an outer annular seat provided with receptacles for nipples associated with spoke ends;

an annular partition which divides said inner and outer seats and which is provided with openings arranged opposite the nipples, said openings being each provided with an edge surrounded by a pendent surface forming a respective undercut that protrudes into said outer annular seat; and closure elements that engage in said openings in order to hermetically separate said outer annular seat from said inner annular seat, said closure elements consisting of sealing plugs, each of which comprises a cylindrical head and a shank that has a cylindrical surface with sealing means formed therebetween, said sealing means being constituted by corresponding helical threads provided on the surface of said shank and, respectively, on the pendent surface forming said undercut, each one of said sealing plugs being adapted to detachably engage in a respective one of said undercuts and hermetically close the respective opening by way of mutual engagement of said corresponding helical threads.

2. A rim for mounting tubeless tires for bicycles, motorcycles and mopeds, constituted by a profiled element which is curved in a circular fashion and is symmetrical with respect to a centerline plane, comprising:

an inner annular seat adapted to receive and retain a tubeless type tire so as to form a pressure chamber;

an outer annular seat provided with receptacles for nipples associated with spoke ends; an annular partition which divides said inner and outer seats and which is provided with openings arranged opposite the nipples;

closure elements that engage said openings in order to hermetically separate said outer annular seat from said inner annular seat which consists of sealing plugs, each of which is adapted to detachably and hermetically engage in a respective one of said openings, and wherein said sealing plugs comprise each a head and a shank with an annular groove formed therebetween that is suitable to engage hermetically an edge of a respective one of said openings and first and second coaxial and mutually opposite cavities formed therein, said shank having a frustum shape and said second cavity having an open end that faces said outer annular seat upon engagement of the sealing plugs in respective ones of said openings; and complementary sealing plugs each adapted to engage a respective sealing plug at a said first cavity thereof.

3. The rim of claim 1, wherein each of said sealing plugs further comprises means for rotating said sealing plug to engage and disengage said corresponding helical threads.

4. The rim of claim 1, further comprising a ring interposed between said head of each of said sealing plugs and said openings.

5. The rim of claim 1, wherein said shank of each of said sealing plugs is substantially coextensive with said pendent surface forming said undercut when said helical threads of said sealing plugs fully engage said helical threads of said pendent surface of said undercut.

6. The rim of claim 1, wherein each of said sealing plugs further comprises a shoulder disposed between said head and said shank, said shoulder contacting said annular partition when said helical threads of said sealing plugs fully engage said helical threads of said pendent surface of said undercut.

7. The rim of claim 2, wherein each of said sealing plugs further comprises an expandable lip associated with said head and a tooth associated with said shank, said expandable lip and said tooth delimiting said annular groove in an upward and, respectively, in a downward region thereof.

8. The rim of claim 2, wherein said complementary sealing plugs are provided with a shank and with expansion elements that detachably engage in said first cavity so as to provide improved sealing action of said plugs in said opening.

9. The rim of claim 2, wherein said sealing plugs have a frustum-like shape, with a head and a shank that are expandable.

10. The rim of claim 8, wherein said expansion elements are constituted by a threaded expandable insert accommodated at a bottom part of said first cavity, said complementary sealing plug being adapted to be screwed with said shank inside said threaded expandable insert.

11. The rim of claim 8, wherein said expansion elements are constituted by frustum-shaped annular protrusions provided at said shank of said complementary sealing plug.

* * * * *